(12) United States Patent
Imazato et al.

(10) Patent No.: US 12,315,662 B2
(45) Date of Patent: May 27, 2025

(54) CURRENT TRANSFORMER MODULE

(71) Applicant: SHT Corporation Limited, Izumisano (JP)

(72) Inventors: Yuichi Imazato, Izumisano (JP); Kazuhiro Kasatani, Izumisano (JP); Kazusa Mori, Izumisano (JP)

(73) Assignee: SHT CORPORATION LIMITED, Osaka (JP)

( * ) Notice: Subject to any disclaimer, the term of this patent is extended or adjusted under 35 U.S.C. 154(b) by 725 days.

(21) Appl. No.: 17/630,633

(22) PCT Filed: Jan. 27, 2021

(86) PCT No.: PCT/JP2021/002711
§ 371 (c)(1),
(2) Date: Jan. 27, 2022

(87) PCT Pub. No.: WO2021/157437
PCT Pub. Date: Aug. 12, 2021

(65) Prior Publication Data
US 2022/0262557 A1    Aug. 18, 2022

(30) Foreign Application Priority Data
Feb. 7, 2020    (JP) ................................. 2020-019315

(51) Int. Cl.
*H01F 27/02*    (2006.01)
*H01F 27/29*    (2006.01)
*H01F 38/30*    (2006.01)

(52) U.S. Cl.
CPC ............ *H01F 27/02* (2013.01); *H01F 27/29* (2013.01); *H01F 38/30* (2013.01)

(58) Field of Classification Search
CPC ....................................................... H01F 27/02
(Continued)

(56) References Cited

U.S. PATENT DOCUMENTS 3,524,156 A    8/1970    Horbach
6,507,261 B1 *  1/2003    Haga ..................... H01F 27/306
                                             336/208
(Continued)

FOREIGN PATENT DOCUMENTS

EP         4 006 929 A1    6/2022
JP         SHO61-201327    12/1986
(Continued)

OTHER PUBLICATIONS

Japanese Patent Office "International Search Report" from Japanese priority application PCT/JP2021/002711, Mar. 21, 2021 (Mar. 12, 2021), 4 pp.
(Continued)

*Primary Examiner* — Ronald Hinson
(74) *Attorney, Agent, or Firm* — Eckert Seamans Cherin & Mellott, LLC

(57) ABSTRACT

The present invention provides a current transformer module that can prevent the primary coil from being lifted or dropped and prevent the bobbin from being cracked when the primary coil is inserted into the bobbin. The current transformer module 12 of the present invention comprises a current transformer 10 including a resin-made bobbin 20 and a core 50 mounted on the bobbin, wherein the bobbin has a U-shaped primary coil 30 disposed in a primary coil through-hole 40 and a wire-wound secondary coil 27, and a casing 80 for housing the current transformer, wherein the primary coil is a U-shaped pin having a pair of legs 32, 32 and a U-shaped bent portion 31 for connecting the legs, and the casing has a concaved contact area 82 positioned opposite the U-shaped bent portion of the primary coil to prevent the primary coil from falling out.

8 Claims, 8 Drawing Sheets

(58) Field of Classification Search
USPC .......................................................... 336/90
See application file for complete search history.

(56) References Cited

U.S. PATENT DOCUMENTS

| | | |
|---|---|---|
| 2011/0115596 A1 | 5/2011 | Lai et al. |
| 2022/0285090 A1 | 9/2022 | Imazato et al. |

FOREIGN PATENT DOCUMENTS

| | | |
|---|---|---|
| JP | SHO63-18824 | 2/1988 |
| JP | H03 227004 A | 10/1991 |
| JP | HEI5-8923 | 2/1993 |
| JP | 2000-156323 A | 6/2000 |
| JP | 2002-64020 | 2/2002 |
| JP | 2004 319663 A | 11/2004 |
| JP | 6647723 B1 | 2/2020 |

OTHER PUBLICATIONS

European Patent Office "Extended European Search Report" for corresponding EP Patent Appl. No. 217514 77. 7, dated Jan. 30, 2024, 7 pp.
China National Intellectual Property Administration "Office Action" for corresponding Chinese patent application No. 202180004793.2, dated Jul. 10, 2024, 11 pp., includes English language translation.
Korean Intellectual Property Office "Office Action" for corresponding Korean patent application No. 10-2022-7002942, includes English machine translation, dated Apr. 1, 2025, 10 pp.

\* cited by examiner

F I G. 1
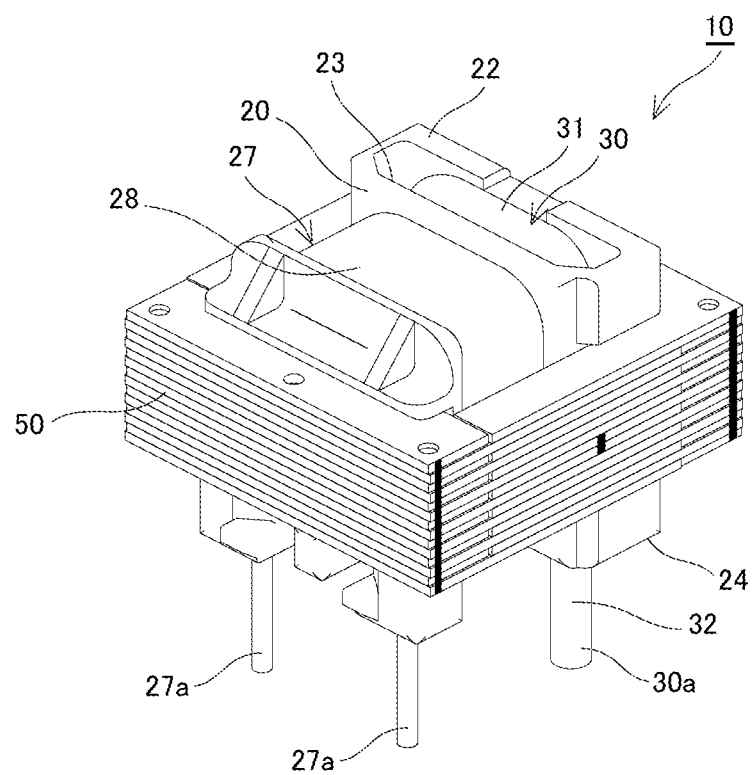

CURRENT TRANSFORMER MODULE

TECHNICAL FIELD

This invention relates to a current transformer module used in various AC equipment and adapted to detect electric currents flowing through the equipment to provide output control and overcurrent protection operation of the equipment. More specifically, the invention relates to a current transformer module wherein a U-shaped pin is employed for a primary coil.

BACKGROUND ART

A current transformer is used to detect electric currents in high-power electric instruments such as air conditioners and IH devices that operate on household power supplies. A current transformer comprises a primary coil, a secondary coil, and a core for forming a magnetic path common to these coils (see, for example, Patent Document 1). In the current transformer, a current-sensing resistor is connected to the secondary coil, and the power supply commercial frequency of the instruments is energized to the primary coil. When the current in the primary coil changes, the magnetic field in the secondary coil changes through a magnetic circuit, creating a potential difference at both ends of the current-sensing resistor in the secondary coil. The difference is detected as a voltage at the current-sensing termination resistor. The instrument inputs the voltage into the microcomputer to control the inverter circuit, etc., to thereby controlling the input to or output from the instrument.

The primary coil uses a so-called U-shaped pin with the conductive wire bent in a U-shape, as shown in Patent Document 1.

A current transformer comprises a core component and a core mounted on the core component. In general, the core component is made by inserting a U-shaped pin, which serves as the primary coil, into a primary coil hole formed in a resin-made cc, and then winding the secondary coil. The current transformer is housed in a resin-made casing to produce a current transformer module.

PRIOR ART DOCUMENT(S)

Patent Document

Patent Document 1: Japanese Utility Model Application Publication SHO.63-18824

SUMMARY OF THE INVENTION

Problems to be Solved by the Invention

When a current transformer module with a U-shaped pin for the primary coil is mounted on a printed circuit board, the terminal portion at the end of the U-shaped pin is pushed by the printed circuit board, sometimes causing the primary coil to lift up.

In addition, if a U-shaped pin is inaccurately shaped, it's is not easy to insert such a U-shaped pin (i.e., primary coil) into the bobbin, and the bobbin sometimes breaks if the pin is inserted forcibly.

To produce a current transformer module, the core component is produced by inserting the U-shaped pin, i.e., the primary coil, into the bobbin and then winding the secondary coil around the bobbin. In the subsequent process, a core is mounted on the core component. The assembly of the core component and core is then inserted into the casing whereby the current transformer module is produced. However, the U-shaped pin sometimes dropped out after the U-shaped pin was inserted into the bobbin and before the current transformer is housed in the casing.

An object of the present invention is to provide a current transformer module that can prevent the primary coil from being lifted or dropped, and prevent the bobbin from being cracked when the primary coil is inserted into the bobbin.

Means to Solve the Problems

A current transformer module of the present invention comprises:
 a current transformer comprising a resin-made bobbin and a core mounted on the bobbin, wherein the bobbin is formed with a primary coil hole of through-hole, and has a U-shaped primary coil disposed through the primary coil hole and a wire-wound secondary coil; and
 a casing for housing the current transformer;
 the primary coil being a U-shaped pin having a pair of legs and a U-shaped bent portion connecting the legs; and
 the casing having a contact area positioned opposite the U-shaped bent portion of the primary coil, wherein the contact area has a concaved surface to prevent the primary coil from falling out.

The casing comprises an upper case and a lower case, and the contact area is formed on the inner side of the upper surface of the upper case.

The legs of the primary coil have their distal ends passing through the primary coil hole of the bobbin, and
 the legs extending out of the primary coil hole are preferably provided with an enlarged retaining portion larger than the primary coil hole.

The primary coil hole preferably includes
 a main hollow section having a diameter equal to or larger than the retaining portion, and
 a reduced diameter section formed at the forward end of the main hollow section and having a diameter smaller than the retaining portion.

The retaining portion may be formed by subjecting the legs to a crushing process.

Effects of the Invention

According to the current transformer module of the present invention, the U-shaped bent portion of the primary coil is held by the contact area of the casing. Therefore, when the legs of the primary coil are inserted into the printed circuit board, the primary coil abuts the contact area, preventing from falling out of the bobbin.

According to the current transformer module of the present invention, the primary coil is formed at distal ends of the legs with a retaining portion so that the primary coil is prevented from falling out of the primary coil hole of the bobbin.

The primary coil hole of the bobbin comprises a main hollow section and a reduced diameter section formed at the forward end of the main hollow section wherein the main hollow section has an enlarged diameter and the reduced diameter section has a diameter smaller than the retaining portion. Therefore, when the legs of the primary coil are inserted into the primary coil hole, they can be easily inserted into the primary coil hole and are hard to fall out, preventing the bobbin from cracking.

BRIEF DESCRIPTION OF THE DRAWINGS

FIG. 1 is a perspective view of the current transformer of one embodiment of the present invention.

MODE FOR CARRYING OUT THE INVENTION

The current transformer 10 and the current transformer module 12 in accordance with one embodiment of the present invention will be explained below with reference to the drawings.

Figure 2:
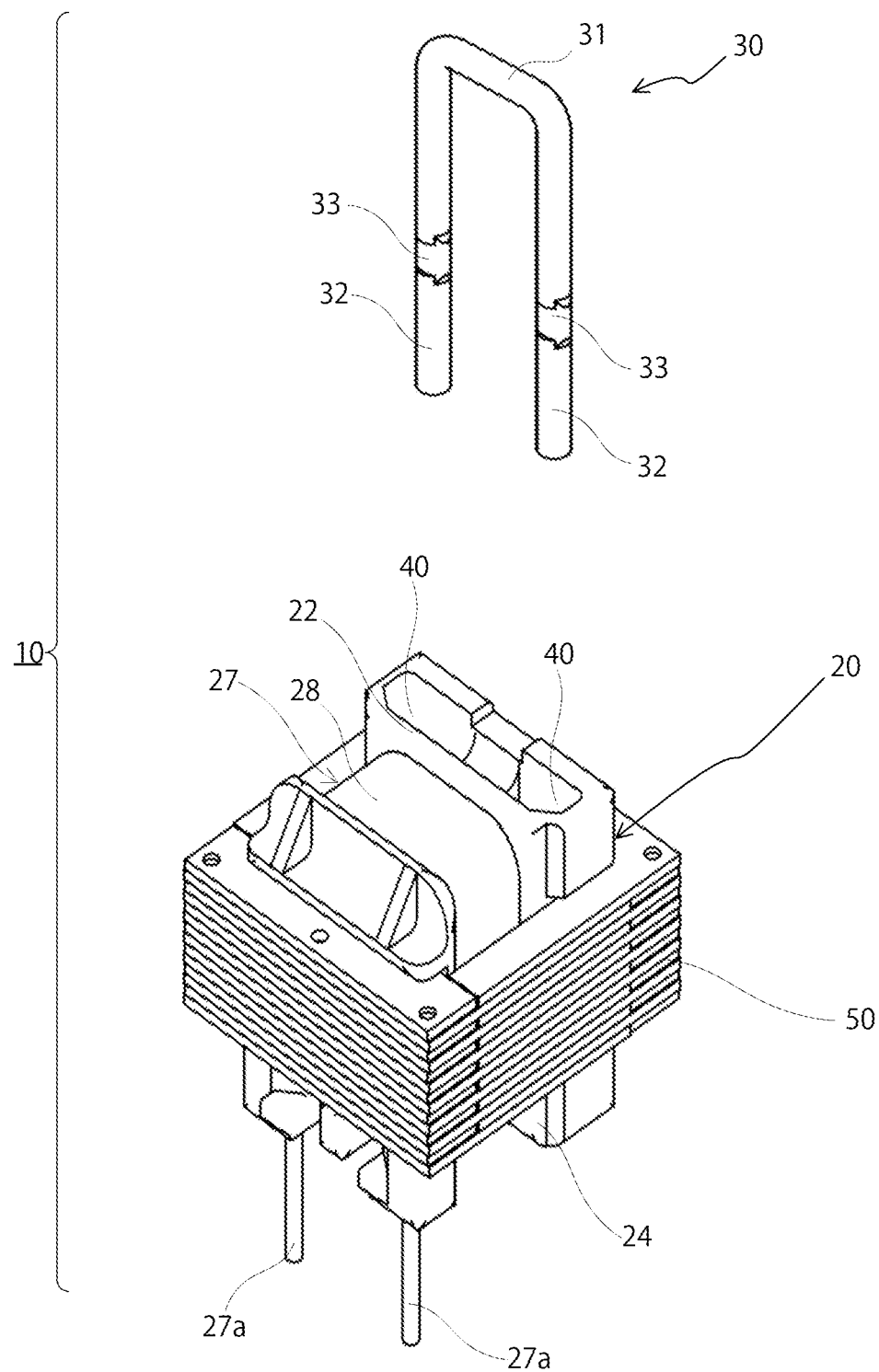
FIG. 2 is a perspective view showing the bobbin and the primary coil that are broken down.
Figure 3:
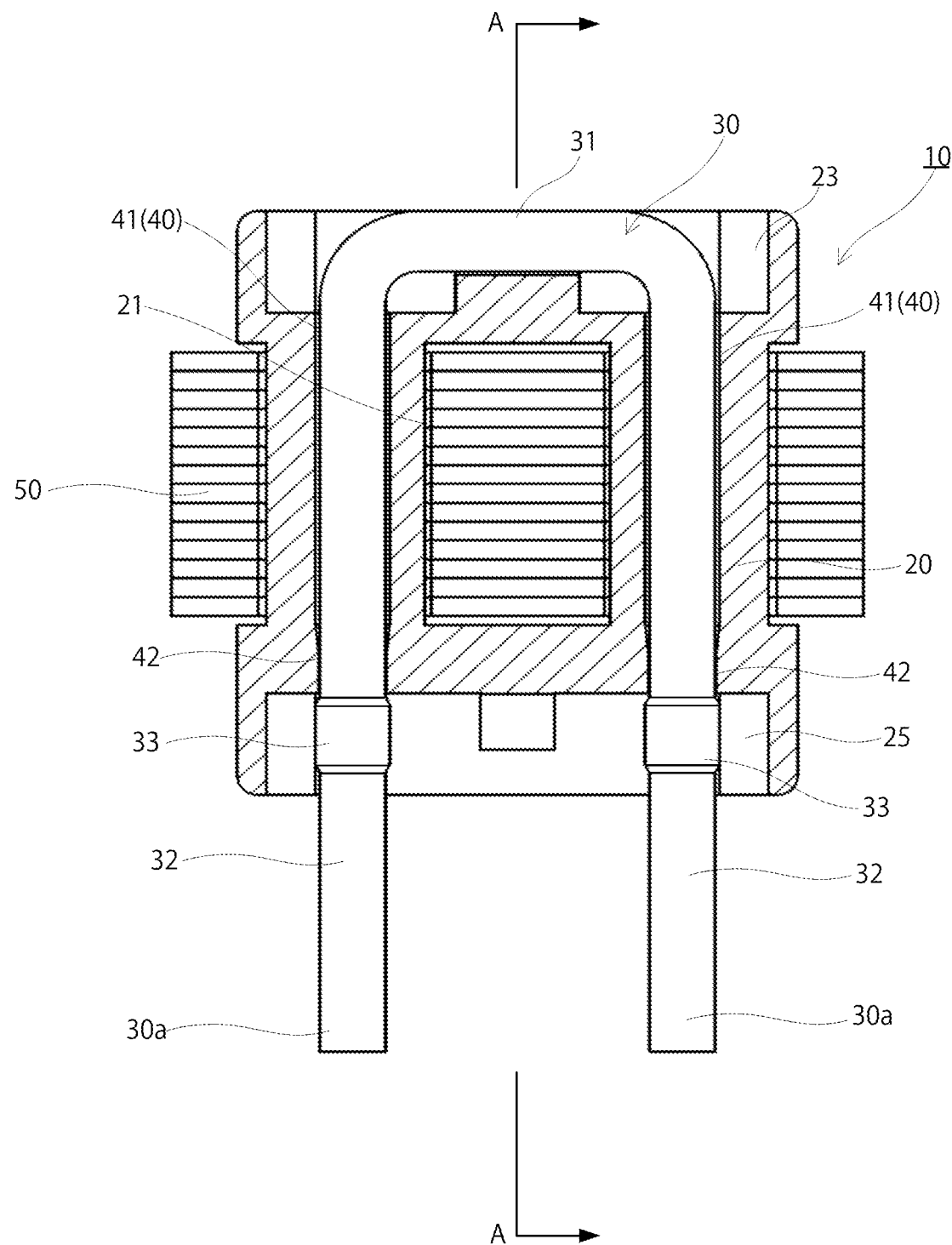
FIG. 3 is a cross-sectional view of the current transformer along the primary coil.
Figure 4:
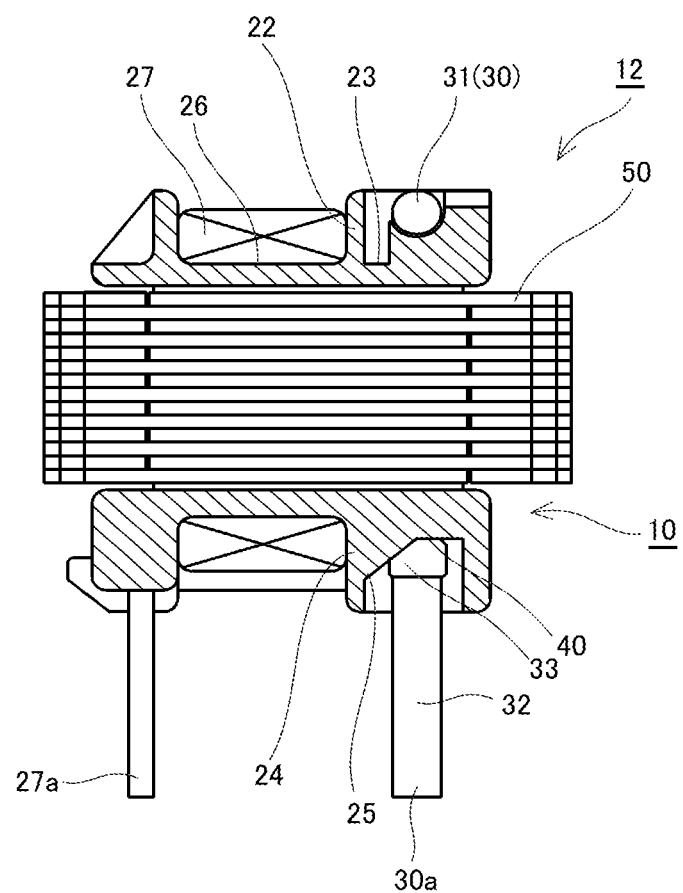
FIG. 4 is a cross-sectional view of the current transformer along line A-A in FIG. 3.

FIG. 1 is a perspective view of the current transformer 10 of one embodiment of the present invention. FIG. 2 is an exploded perspective view of the current transformer 10. FIG. 3 is a cross-sectional view of the current transformer 10 along the primary coil 30. FIG. 4 is an aligned cross-sectional view along line A-A in FIG. 3. As shown in these figures, the current transformer 10 comprises a resin-made bobbin 20 having a U-shaped coil 30 and a thin wire-wound secondary coil 27, and a core 50 that provides a magnetic path in common with the primary coil 30 and the secondary coil 27.

<Bobbin 20>

The bobbin 20 is formed at near the one end thereof with primary coil holes 40, 40 (see FIG. 3) into which the U-shaped primary coil 30 is inserted. The bobbin 20 is also formed in the center thereof with a concaved secondary coil winding section 26 (see especially FIG. 4) on which the secondary coil 27 is wound.

In the illustrated embodiment, the bobbin 20 is provided between the primary coil hole 40 and the second coil winding section 26 with an upper insulating wall 22 at the top and a lower insulating wall 24 at the bottom, to thereby providing an insulation between the primary coil 30 and the secondary coil 27. These insulating walls 22, 24 keep the creepage distance of the insulation (the shortest distance measured along the surface of the insulation) between the primary coil 30 and secondary coil 27.

As shown in FIGS. 1 to 4, the bobbin 20 has an upper insulating wall 22 formed between the primary coil 30 and the secondary coil 27. And there is formed an upper side recess 23 between the upper insulating wall 22 and the primary coil 30. The upper side recess 23 is engaged with an upper side protrusion 83 (see FIGS. 8 and 9) formed on the upper case 81 to be described later to ensure the creepage distance of insulation together with the upper insulating wall 22.

As shown in FIG. 4, the bobbin 20 has a lower side recess 25 formed between the lower insulation wall 24 and the primary coil 30. The lower side recess 25 is engaged with a lower side protrusion 87 (see FIGS. 6, 8 and 10) formed on the lower case 85 to be described later to ensure the creepage distance of insulation together with the lower insulating wall 24.

Figure 5:
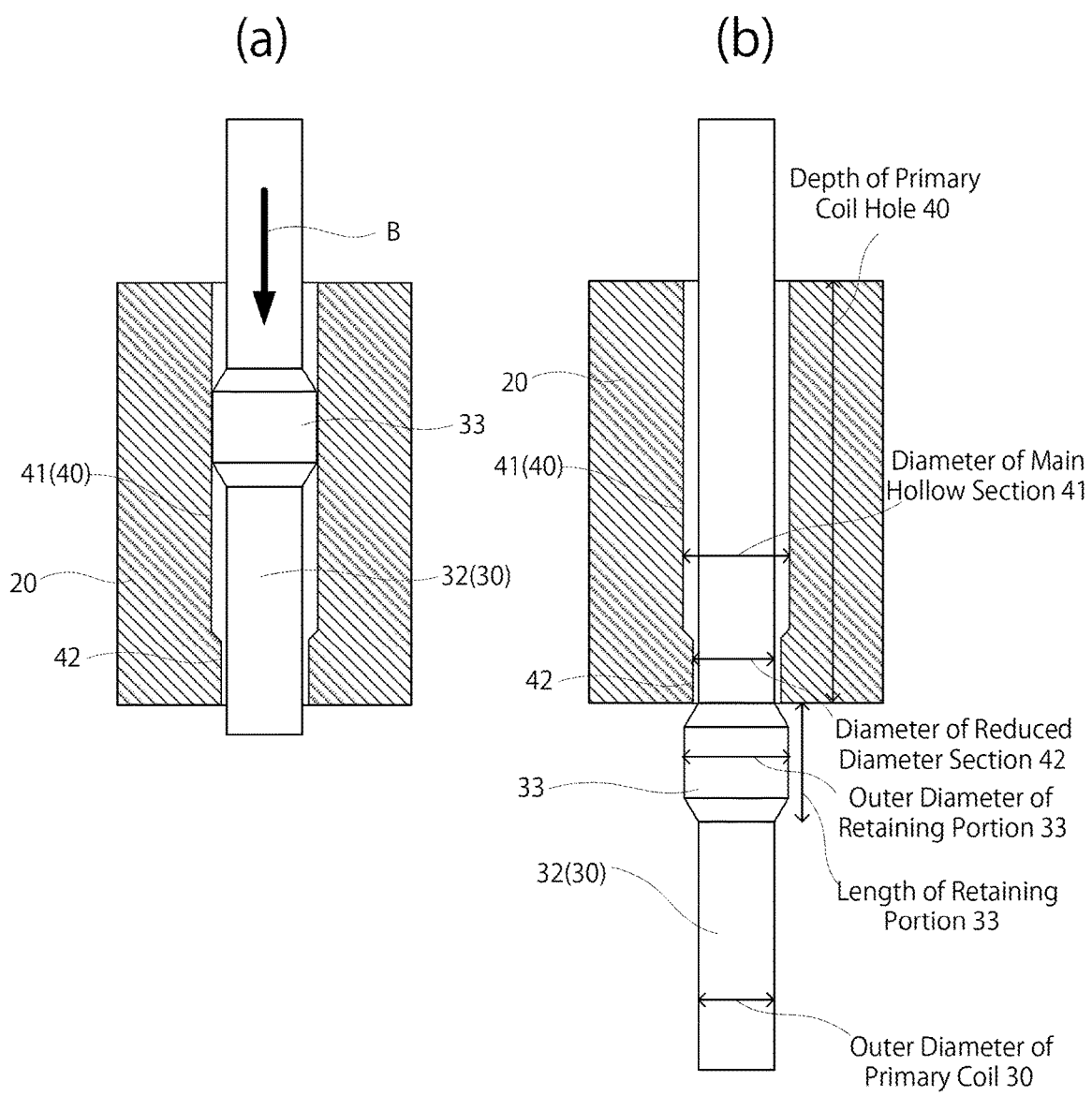
FIG. 5 is an enlarged sectional view of the primary coil hole of the bobbin and the leg of the primary coil, wherein (a) shows a state where the primary coil is being inserted, and (b) shows a state where the primary coil was inserted into the primary coil hole.

The primary coil hole 40 of the bobbin 20 will be explained below in more detail. The primary coil hole 40 is opened through the bobbin 20 substantially vertically. The primary coil hole 40 is formed such that at least part thereof is smaller in diameter than the retaining portion 33 of the leg 32 of the primary coil 30 to be described later. The primary coil holes 40, 40 may have the same diameter over the entire length of the main hollow section 41 from the proximal end side from where the leg 32 is inserted, to the distal end side where the retaining portion 33 passes through and exits the main hollow section 41. In this regard, as shown in FIGS. 3 and 5, the primary coil hole 40 may have a reduced diameter section 42 smaller in diameter than the retaining portion 33, near the distal end of the main hollow section 41. By providing the reduced diameter section 42, the diameter of the main hollow section 41 can be formed equal to or larger than the retaining portion 33. Therefore, the legs 32 can be inserted smoothly into the main hollow section 41, preventing the bobbin 20 from being broken. The reduced diameter section 42 may be tapered from the connection portion with the main hollow section 41, which makes it possible to smoothly pass the legs 32 and retaining portion 33 of the primary coil. In addition, the proximal end of the main hollow section 41 (the side from where the leg 32 is inserted) may be in a tapered form to insert the primary coil 30 easier into the primary coil hole 40.

As shown in FIG. 3, the bobbin 20 is also formed with a hollow section 21 in the direction orthogonal to the primary coil 30 and the secondary coil 27, and the core 50 can be disposed in the hollow section 21.

<Primary Coil 30>

The primary coil 30 is a so-called U-shaped pin formed by bending a conductive wire, as shown in FIGS. 1 and 4, and comprises a pair of legs 32, 32 and a U-shaped bent portion 31 connecting the legs 32, 32. The primary coil 30 has a retaining portion 33 with a thicker wire diameter on one or both of the legs 32, 32.

The U-shaped primary coil 30 has retaining portions 33, 33 formed on the legs 32, 32, as shown in FIGS. 2 to 5. The retaining portion 33 may be made by crushing the conductive wire, for example, by crimping. The retaining portion 33 can be formed at a position extending out of the distal end of the primary coil hole 40 in a state that the legs 32 of the primary coil 30 are inserted into the primary coil holes 40 of the bobbin 20 and then the primary coil 30 is mounted on the bobbin 20. The retaining portion 33 preferably has an outer diameter larger than the main hollow section 41 of the primary coil hole 40 and the reduced diameter section 42.

When the current transformer module 12 is formed, the distal end portions of legs 32, 32 of the primary coil 30 are served as terminal lines 30a, 30a extending out of the insertion hole 86a, 86a of the lower case 85, which will be described later.

The primary coil 30 may be 1.0 mm to 2.0 mm in diameter. The diameter of the retaining portion 33 of the leg 32 is preferably at least 0.05 mm, more preferably at least 0.08 mm larger than the diameter of the conductive wire. On the other hand, if the retaining portion 33 is too thick compared to the diameter of the conductive wire, the retaining portion 33 cannot be inserted into the primary coil hole 40. Even if it can be inserted, the portion other than the retaining portion 33 becomes relatively thinner compared to the retaining portion 33, so that the primary coil 30 cannot be adequately secured in the primary coil hole 40, which may cause the primary coil 30 to wobble. It is therefore suitable to make the retaining portion 33 up to about 0.13 mm larger than the diameter of the primary coil 30.

When the primary coil 30 with a main hollow section 41 having a uniform diameter is used, the diameter of the primary coil hole 40 to be formed in the bobbin 20 is preferably equal to the retaining portion 33, or equal to or about 0.02 mm larger than the diameter of the primary coil 30. When the primary coil 30 with a main hollow section 41 having a reduced diameter section 42 is used, the diameter of the reduced diameter section 42 is preferably equal to the retaining portion 33, or about 0.05 mm to 0.1 mm smaller than the retaining portion 33.

<Secondary Coil 27>

The secondary coil 27 is formed by winding a thin wire around the secondary coil winding section 26 of the bobbin 20, as shown in FIG. 4, and is protected on the outer periphery with tape 28. The secondary coil 27 has terminal lines 27a, 27a that extend out of the insertion hole 86a, 86b of the lower case 85 to be described later, and are served as the electrical end of the secondary coil 27.

<Core 50>

The core 50 is made of electromagnetic steel sheet and mounted such that it spans the side and hollow section 21 of the bobbin 20 (see FIG. 3). The core 50 comprises a core component prepared from a stack of E-type cores obtained by press-punching silicon steel sheets, etc., or a stack of the E-type core and I-type core. Such core component is inserted into the hollow section 21 alternately from the opposing sides of the hollow section 21 to combine into a single form and mounted on the bobbin 20. The structure of the core 50 and the mounting method of the core 50 are not limited to the embodiment shown in the figure.

<Current Transformer 10>

As shown in FIGS. 2 to 5, more particularly, arrow B in FIG. 5 (a), the primary coil 30 is inserted into the primary coil hole 40 of the bobbin 20. The main hollow section 41 of the primary coil hole 40 has a diameter larger than the outer diameter of the leg 32, preventing the bobbin 20 from cracks when the legs 32, 32 are inserted into the main hollow section 41. Further, as shown in FIG. 5 (b), the legs 32, 32 pass through the primary coil hole 40 of the bobbin, and the retaining portion 33 emerges over the diameter reduced section 42, whereby the retaining portion 33 operates as a stopper to the reduced diameter section 42. Thus, the primary coil 30 is unretractably secured in the primary coil hole 40.

The retaining portion 33 goes through the primary coil hole 40 via the reduced diameter section. Therefore, the retaining portion 33 does not cause residual stress on the primary coil hole 40, i.e., the main hollow section 41, the reduced diameter section 42, or even the bobbin 20, and prevents the bobbin 20 from cracks when the primary coil 30 is inserted or afterwards.

The current transformer 10 is manufactured by inserting the primary coil 30 into the primary coil hole 40, winding the secondary coil 27 around the secondary coil winding section 26, and mounting the core 50 on the bobbin 20. The assembling of the primary coil 30, secondary coil 27, and core 50 is, of course, not limited to this order. In the present invention, the primary coil 30 can be mounted on the bobbin 20 without a possibility of dropout due to the presence of the retaining portion 33. Therefore, the primary coil 30 does not fall out of the bobbin 20, even when various operations are performed in a state that the primary coil 30 is installed, making the manufacturing process of the current transformer 10 as efficient as possible.

<Current Transformer Module 12>

Figure 6:
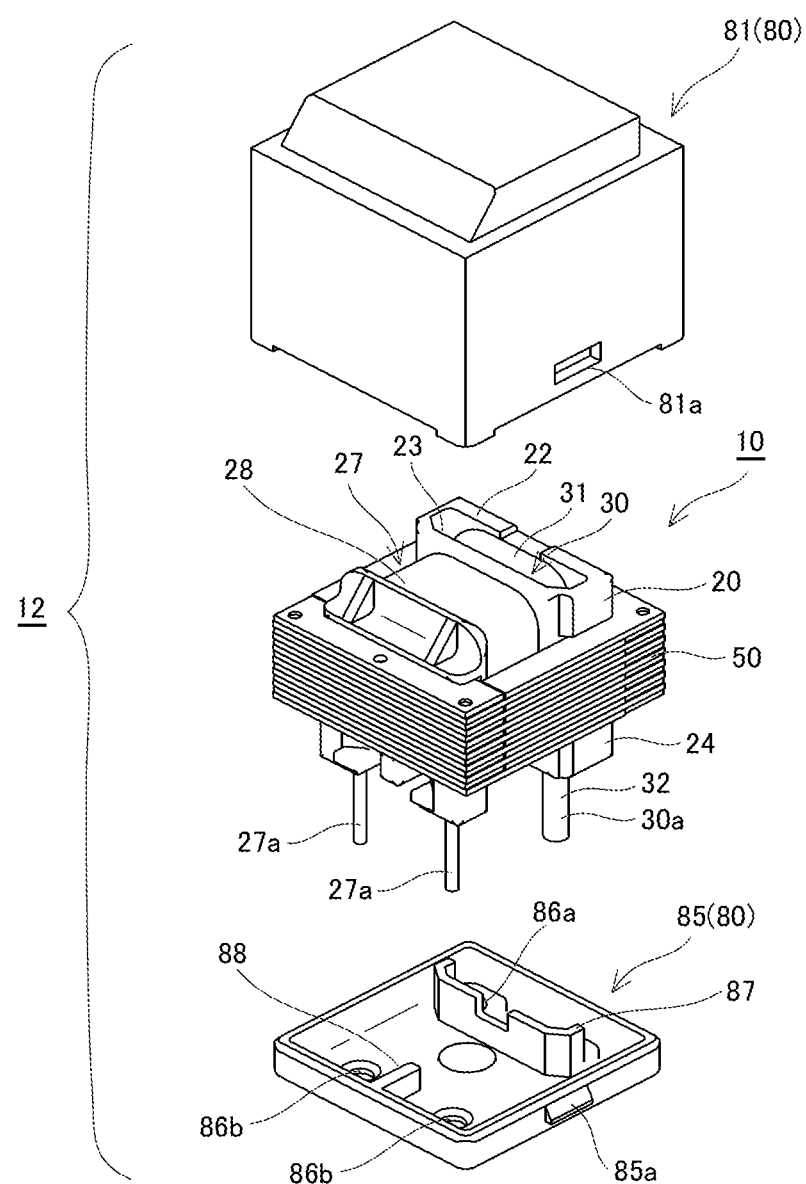
FIG. 6 is an exploded perspective view of the current transformer module.
Figure 7:
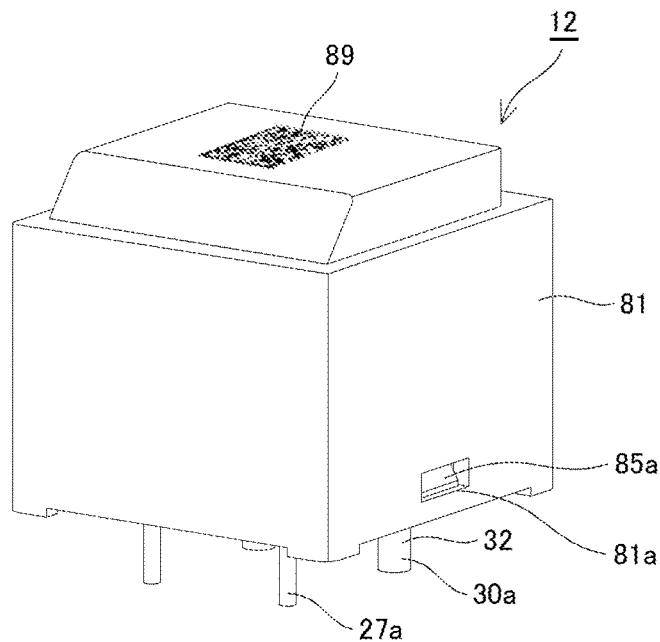
FIG. 7 is a perspective view showing the current transformer module.
Figure 8:
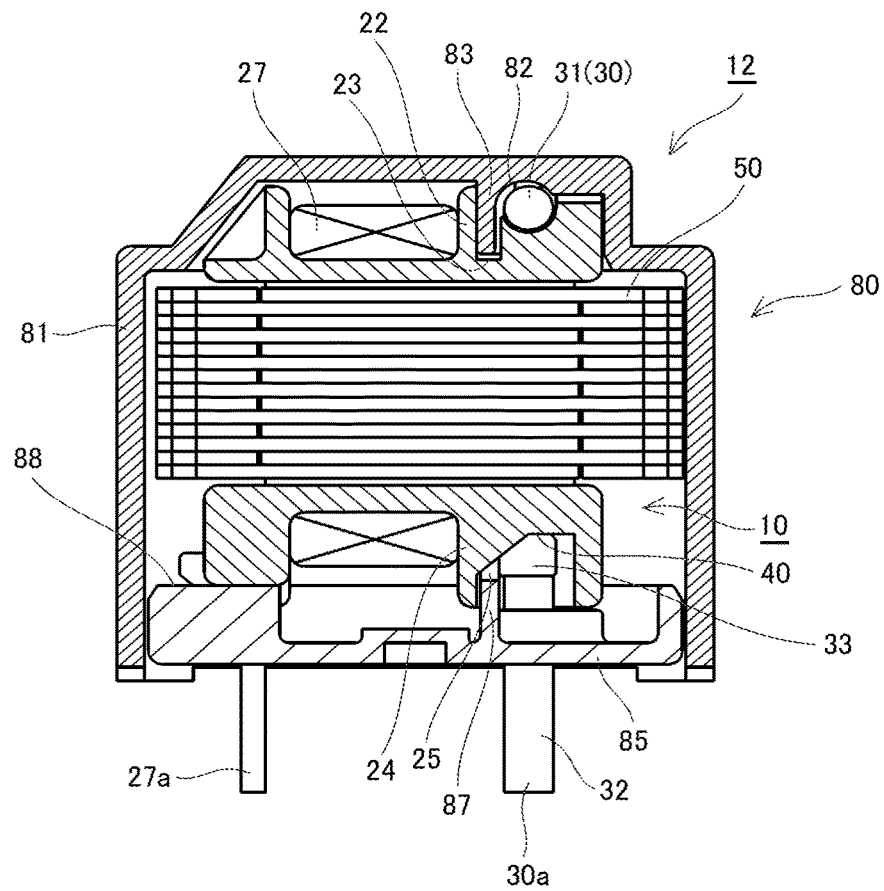
FIG. 8 is a cross-sectional view of the current transformer module.
Figure 9:
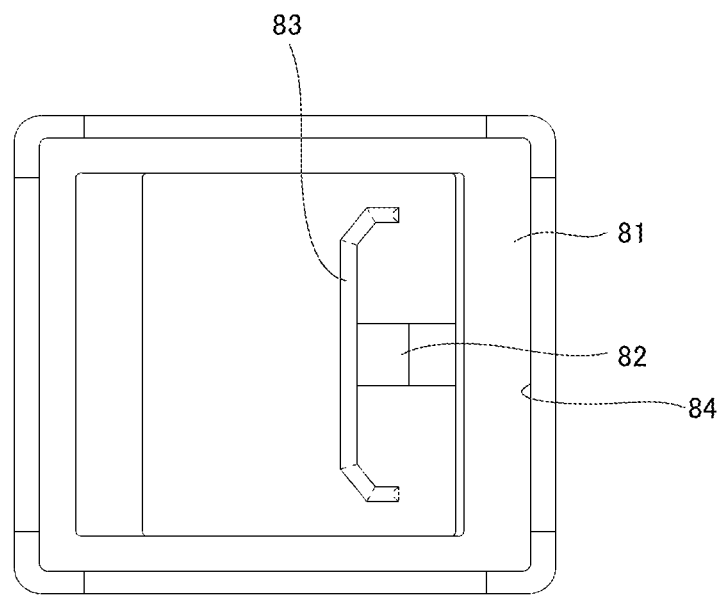
FIG. 9 is a bottom view of the upper case.
Figure 10:
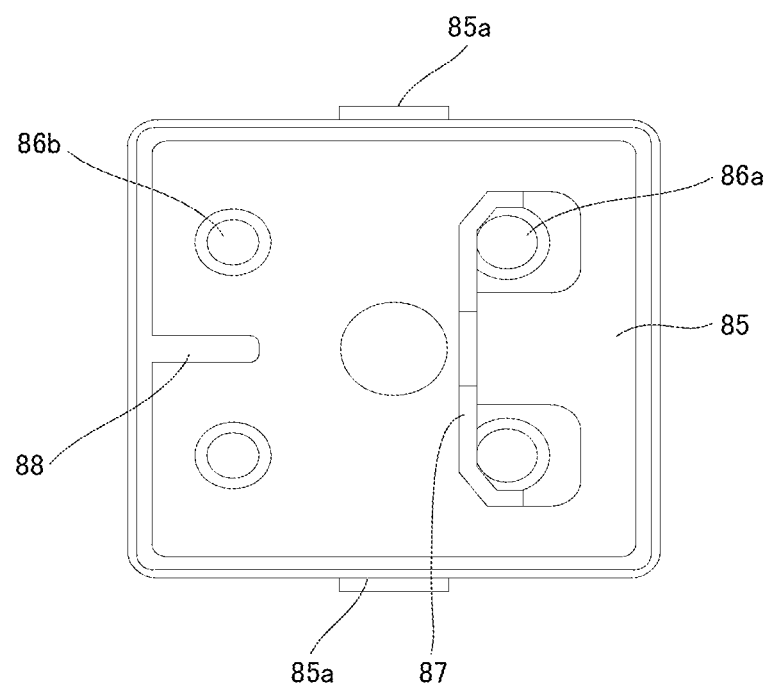
FIG. 10 is a plan view of the lower case.

The current transformer 10 obtained as described above can be housed in a casing 80 and used as a current transformer module 12. FIG. 6 is an exploded perspective view of the current transformer 10 and the casing 80 for housing the current transformer. FIG. 7 is a perspective view showing the current transformer module 12. FIG. 8 is a longitudinal cross-sectional view of the current transformer module 12. FIG. 9 is a bottom view of the upper case 81 constituting the casing 80. FIG. 10 is a plan view of the lower case 85.

As shown in the figures, the casing 80 comprises an upper case 81 and a lower case 85. The upper case 81 is a box-like shape with an opening on its underside and is configured to house the core 50 and the bobbin 20. The lower case 85 is a plate-like shape to place the bobbin 20 thereon and close the lower surface of the upper case 81.

As shown in FIGS. 8 and 9, the upper case 81 is formed on the inner side of the upper surface thereof with a contact area 82 that the U-shaped bent portion 31 of the primary coil 30 comes into contact when the current transformer 10 is housed in the upper case 81. The contact area 82 may be a concaved shape along the outer configuration of the primary coil 30. When the current transformer module 12 is mounted on a printed circuit board, etc., the contact area 82 prevents the primary coil 30 from lifting off the bobbin 20, even if the printed circuit board press against the terminal wires 30a, 30a. This synergistically provides a superior effect together with the retaining portion 33 of the primary coil 30.

The upper case 81 has an upper side protrusion 83 adapted to fit into the upper side recess 23 formed between the upper insulation wall 22 and the primary coil 30.

In addition, as shown in FIGS. 6 and 7, the upper case 81 is formed near the lower edge thereof with an engagement receiving portion 81a into which the engagement claw 85a of the lower case 85 is configured to fit.

As shown in FIGS. 6 and 10, the lower case 85 is formed with insertion holes 86a, 86a through which terminal lines 30a, 30a of the primary coil 30 are extendable, and is formed with insertion holes 86b, 86b through which terminal lines 27a, 27a of the secondary coil 27 are extendable.

The lower case 85 has a lower side protrusion 87 adapted to fit into the lower side recess 25 formed between the lower insulation wall 24 and the primary coil 30.

In addition, the lower case 85 may be provided with an engagement claw 85a that is configured to fit into the engagement receiving portion 81a of the upper case 81.

The current transformer 10 is mounted on the lower case 85 by inserting the terminal wires 30a and 27a into the insertion holes 86a and 86b, respectively. At this time, as shown in FIG. 8, the lower side protrusion 87 of the lower case 85 fits into the lower side recess 25 of the bobbin 20.

Then, the upper case 81 is put over the lower case 85, with the current transformer 10 placed in lower case 85. The upper case 81 is engaged with the lower case 85 by fitting the engagement receiving portion 81a into the engagement claw 85a of the lower case 85 whereby a casing 80 is assembled. In this case, the upper side protrusion 83 of the upper case 81 fits into the upper side recess 23 of the bobbin 20.

Thus, the current transformer module 12 with the current transformer 10 housed in the casing 80 can be obtained. The obtained current transformer module 12 is shown in FIG. 7.

According to the current transformer module 12 of the present invention, the contact area 82 formed on the upper case 81 abuts against the U-shaped bent portion 31 of the primary coil 30. Therefore, when the current transformer module 12 is mounted on a printed circuit board, etc., the contact area 82 can prevent the primary coil 30 from lifting off the bobbin 20, even if the terminal wires 30a, 30a of the primary coil 30 are pressed by the printed circuit board.

According to the current transformer module 12 of the present invention, as shown in FIG. 8, the bobbin 20 is provided with an upper insulating wall 22 and has the upper side recess 23 engageable with the upper side protrusion 83 of the upper case 81, such that the creepage distance of insulation is ensured. The bobbin 20 is also provided with a lower insulating wall 24 and has the lower side recess 25 engageable with the lower side protrusion 87 of the lower case 85, such that the creepage distance of insulation is ensured. Thus, the insulation between the primary coil 30 and the secondary coil 27 is established.

Meanwhile, there is a demand for downsizing the current transformer module 12. To downsize the current transformer module 12, it is required to reduce the size of the current transformer 10. On the other hand, the current transformer 10 is also required to keep the creepage distance of insulation between the primary coil 30 and the secondary coil 27, as mentioned above. In this regard, according to the present invention, the creepage distance of insulation is ensured by the presence of the upper insulation wall 22 and the engagement of the upper side recess 23 with the upper side protrusion 83, and the presence of the lower insulation wall 24 and the engagement of the lower side recess 25 with the lower side protrusion 87. Therefore, the upper and lower insulating walls 22 and 24 can be adequately insulated without increasing their protruding heights. The current transformer 10 can be made smaller, and the current transformer module 12 can also be made smaller.

The above description is intended to explain the invention and should not be construed as limiting or reducing the scope of the invention as described in the claims. The present invention is not limited to the above examples, and of course various variations are possible within the technical scope of the claims.

For example, the lower case 85 may be provided with a step portion 88 to support the lower surface of the bobbin 20. When the bottom surface of the bobbin 20 contacts the step portion 88 of the lower case 85, the bobbin 20 can be held in the casing 80 without tilting.

After making the current transformer module 12, the output voltage characteristics are individually measured, and the obtained characteristic data can be printed or sealed on the upper case 81 as a data matrix 89, as shown in FIG. 7. This provides that when the current transformer module 12 is employed in AC equipment, the data matrix 89 can be read and the characteristics can be adjusted on the control based on the corresponding characteristic data, thus achieving an improved accuracy in the output voltage characteristics.

EXAMPLE

A U-shaped pin that provides the primary coil 30 was made by bending a conductive wire. Thus made U-shaped pin is inserted into the primary coil hole 40 of the bobbin 20, with the retaining portions 33 having various outer diameters. The fixed status of the primary coil 30 was examined by measuring the pull-out strength.

The primary coil 30 was prepared into a U-shaped form by bending a solder-plated copper wire with a diameter of 1.6 mm. The legs 32, 32 were subjected to crushing works to form the retaining portion 33 having an outer diameter of 1.63 mm to 1.75 mm and a length of 2.0 mm (Examples 1-7), as shown in Table 1. The primary coil hole 40 was formed in and through the bobbin 20 made of phenol resin material, and is 1.8 mm in diameter of the main hollow section, 1.63 mm in diameter of the reduced diameter section 42, and 5 mm in the hole depth. The primary coil hole 40 is tapered from the main hollow section 41 to the reduced diameter section 42 to narrow the hole diameter. FIG. 5 shows only one leg 32 and one primary coil hole 40, but both legs 32 and 32 of the primary coil 30 have the retaining portion 33, and the primary coil hole 40 is also a pair.

The legs 32, 32 of the primary coil 30 were inserted into the primary coil holes 40, 40, and the push-through strength of the primary coil 30 was measured. Then, the legs 32, 32 of the primary coil 30 were pulled out of the primary coil hole 40 and the pull-out strength of the primary coil 30 was measured. The fixed status of the primary coil 30 was evaluated from the push-through strength and pull-out strength. The test was conducted by rotating the bobbin 20 having the primary coil 30 mounted thereon by hand and also rotating the bobbin 20 at 12,000 rpm for 20 seconds as the condition of winding the secondary coil 27. The test results are shown in Table 1. In Table 1, the sign "OK" indicates that the primary coil 30 did not fall off the bobbin 20, and the sign "NG" indicates that the primary coil 30 fell off the bobbin 20.

TABLE 1

| | Diameter of Retaining Portion (mm) | Push-through Strength (per leg) | Pull-out Strength (per leg) | Assessment of Fixed Status |
| --- | --- | --- | --- | --- |
| Example 1 | 1.63 | 0 N | 0 N | NG |
| Example 2 | 1.65 | 0 N | 0 N | NG |
| Example 3 | 1.68 | 13 N | 11 N | OK |
| Example 4 | 1.70 | 19 N | 15 N | OK |
| Example 5 | 1.72 | 38 N | 38 N | OK |
| Example 6 | 1.73 | 50 N | 42 N | OK |
| Example 7 | 1.75 | 60 N | — | impossible |

With reference to Table 1, Examples 1 and 2 were 0 N for the push-through strength and 0 N for the pull-out strength. This indicates that the legs 32 passed through the primary coil hole 40, and the retaining portion 33 passed through the reduced diameter section 42 without any resistance. Assessment of the fixed status of the primary coil was "NG."

Examples 3 to 6 reveals that the push-through strength was 13 N to 50 N (per leg), and the pull-out strength was 11 N to 42 N (per leg). As for Example 7, the bobbin 20 cracked at 60 N of the push-through strength. But at up to 50 N, the legs 32, 32 were not bent and the bobbin 20 did not crack. Therefore, Examples 3 to 6 do not have any particular problems in mounting the primary coil 30 on the bobbin 20.

The pull-out strength is generally considered sufficient if the primary coil 30 does not fall off the bobbin 20, when the bobbin 20 with the primary coil 30 is rotated by hand or the bobbin 20 is rotated at 12,000 rpm for 20 seconds to wind the secondary coil 27. In addition, when the current transformer module 12 is mounted on a printed circuit board, the force applied to the current transformer module 12 is considered about up to 10 N (per leg). In other words, the pull-out strength is required to be more than 10 N. With regard to Examples 3 to 6, the pull-out strength was more than 10 N. As for Examples 3 to 6, the primary coil 30 did not fall off from the bobbin 20 when the winding of the secondary coil 27 was performed, and the primary coil 30 did not fall off even when the current transformer module 12 was mounted on the printed circuit board. Therefore, the Examples 3 to 6 shows that assessment of the fixed status of the primary coil 30 was "OK." This is the effect of having formed the retaining portion 33 on the legs 32, 32.

Example 7 having the retaining portion 33 with an outer diameter of 1.75 mm required 60 N (per leg) when the legs 32, 32 are inserted into the primary coil holes 40, 40, resulting in that the bobbin 20 cracked during the push-through process. Therefore, the pull-out strength could not be measured. Thus, the assessment of fixed status of the primary coil was impossible.

As described above, for the reduced diameter portion having a diameter of 1.63 mm, the primary coil 30 was adequately fixed to the bobbin 20 and the bobbin 20 was prevented from being cracked by adjusting the outer diameter of the retaining portion 33 to the range of 1.68 mm to 1.73 mm.

EXPLANATION OF REFERENCE NUMBERS

10 Current transformer
12 Current transformer module
20 Bobbin
30 Primary coil
32 Leg
33 Retaining portion
40 Primary coil hole
41 Main hollow section
42 Reduced diameter section
50 Core
80 Casing
82 Contact area

The invention claimed is:

1. A current transformer module, comprising:
a current transformer comprising a resin-made bobbin and a core mounted on the bobbin, wherein the bobbin is formed with a primary coil hole of through-hole, and has a U-shaped primary coil disposed through the primary coil hole and a wire-wound secondary coil; and
a casing for housing the current transformer;
the primary coil being a U-shaped pin having a pair of legs and a U-shaped bent portion connecting the legs,
the legs of the primary coil having distal ends passing through the primary coil hole of the bobbin; and
the legs extending out of the primary coil hole being provided with a retaining portion larger than the primary coil hole; wherein the primary coil hole includes a main hollow section having a diameter equal to or larger than the retaining portion, and
a reduced diameter section formed at the forward end of the main hollow section and having a diameter smaller than the retaining portion.

2. The current transformer module according to claim 1 wherein the retaining portion is formed by subjecting the legs to a crushing process.

3. The current transformer module according to claim 2 wherein the casing has a contact area positioned opposite the U-shaped bent portion of the primary coil, the contact area having a concaved surface to prevent the primary coil from falling out.

4. The current transformer module according to claim 1 wherein the casing has a contact area positioned opposite the U-shaped bent portion of the primary coil, the contact area having a concaved surface to prevent the primary coil from falling out.

5. A current transformer module, comprising:
a current transformer comprising a resin-made bobbin and a core mounted on the bobbin, wherein the bobbin is formed with a primary coil hole of through-hole, and has a U-shaped primary coil disposed through the primary coil hole and a wire-wound secondary coil; and
a casing for housing the current transformer;
the primary coil being a U-shaped pin having a pair of legs and a U-shaped bent portion connecting the legs;
the casing comprising an upper case and a lower case;
the contact area being formed on the inner side of the upper surface of the upper case;
the legs of the primary coil having distal ends passing through the primary coil hole of the bobbin; and
the legs extending out of the primary coil hole being provided with a retaining portion larger than the primary coil hole; wherein the primary coil hole includes a main hollow section having a diameter equal to or larger than the retaining portion, and
a reduced diameter section formed at the forward end of the main hollow section and having a diameter smaller than the retaining portion.

6. The current transformer module according to claim 5 wherein the retaining portion is formed by subjecting the legs to a crushing process.

7. The current transformer module according to claim 6 wherein the casing has a contact area positioned opposite the U-shaped bent portion of the primary coil, the contact area having a concaved surface to prevent the primary coil from falling out.

8. The current transformer module according to claim 5 wherein the casing has a contact area positioned opposite the U-shaped bent portion of the primary coil, the contact area having a concaved surface to prevent the primary coil from falling out.

* * * * *